(12) United States Patent
Muro-Calderon

(10) Patent No.: US 10,410,515 B2
(45) Date of Patent: Sep. 10, 2019

(54) EMERGENCY VEHICLE ALERT SYSTEM

(71) Applicant: Jose Muro-Calderon, Fontana, CA (US)

(72) Inventor: Jose Muro-Calderon, Fontana, CA (US)

( * ) Notice: Subject to any disclaimer, the term of this patent is extended or adjusted under 35 U.S.C. 154(b) by 0 days.

(21) Appl. No.: 15/940,972

(22) Filed: Mar. 30, 2018

(65) Prior Publication Data
US 2018/0286231 A1   Oct. 4, 2018

Related U.S. Application Data

(60) Provisional application No. 62/479,317, filed on Mar. 31, 2017.

(51) Int. Cl.
*G08G 1/0965* (2006.01)
*H04W 4/48* (2018.01)
*H04W 4/46* (2018.01)

(52) U.S. Cl.
CPC ............ *G08G 1/0965* (2013.01); *H04W 4/46* (2018.02); *H04W 4/48* (2018.02); *H04R 2430/01* (2013.01)

(58) Field of Classification Search
None
See application file for complete search history.

(56) References Cited

U.S. PATENT DOCUMENTS

| | | | | |
|---|---|---|---|---|
| 4,775,865 A * | 10/1988 | Smith | ..................... | G08G 1/087 340/906 |
| 6,362,749 B1 * | 3/2002 | Brill | ..................... | G08G 1/0965 174/36 |
| 6,417,782 B1 * | 7/2002 | Darnall | ................. | G08G 1/0965 340/435 |
| 6,792,351 B2 * | 9/2004 | Lutter | ................... | G08G 1/0965 701/418 |
| 6,822,580 B2 * | 11/2004 | Ewing | ................... | G08G 1/0965 180/167 |
| 6,850,169 B2 * | 2/2005 | Manavi | ................... | G08G 1/096 340/691.6 |
| 6,940,422 B1 * | 9/2005 | Bachelder | .............. | G08G 1/087 340/906 |
| 7,047,114 B1 * | 5/2006 | Rogers | ..................... | G08G 3/02 340/438 |
| 7,061,402 B1 * | 6/2006 | Lawson | ............... | G08G 1/0965 340/901 |
| 7,107,081 B1 * | 9/2006 | Fujisaki | ................ | H04M 1/271 455/575.1 |
| 7,167,106 B2 * | 1/2007 | Haase | ................ | G06Q 30/0265 340/902 |
| 7,183,944 B2 * | 2/2007 | Gutta | ................... | G08G 1/0965 340/937 |
| 7,327,280 B2 * | 2/2008 | Bachelder | ................. | F41G 9/00 340/902 |

(Continued)

*Primary Examiner* — Steven Lim
*Assistant Examiner* — Muhammad Adnan
(74) *Attorney, Agent, or Firm* — Bruce A. Lev

(57) ABSTRACT

An emergency vehicle alert system is an emergency vehicle transmitter system with multiple possible passenger vehicles, motorcycle, and pedestrian receivers that are able to receive the emergency signal when located or passing within a predetermined radius. The system, in addition to the audio warning system, may be adapted to reduce or to silence the volume of radios and personal electronic devices within proximity to the emergency transmission.

1 Claim, 3 Drawing Sheets

(56) References Cited

U.S. PATENT DOCUMENTS

| | | | | |
|---|---|---|---|---|
| 7,515,065 B1* | 4/2009 | Bygrave | G08G 1/0965 | 340/901 |
| 7,629,898 B2* | 12/2009 | Kirkpatrick | G08G 1/0965 | 340/691.6 |
| 7,884,738 B2* | 2/2011 | Pappas | G08G 1/087 | 340/815.45 |
| 7,890,136 B1* | 2/2011 | Fujisaki | H04M 1/575 | 455/556.1 |
| 8,081,738 B2* | 12/2011 | Takeda | H04M 11/04 | 348/211.12 |
| 9,022,291 B1* | 5/2015 | van der Merwe | G06K 19/06112 | 235/380 |
| 9,224,294 B1* | 12/2015 | St. John | G08G 1/0965 | |
| 9,467,944 B2* | 10/2016 | Khay-Ibbat | H04W 52/0225 | |
| 9,564,049 B2* | 2/2017 | Diba | G08G 1/087 | |
| 9,704,397 B1* | 7/2017 | Bjorklund | G08G 1/0965 | |
| 9,858,818 B2* | 1/2018 | Shibata | G08G 1/162 | |
| 10,152,832 B1* | 12/2018 | Brandt | G06Q 10/063 | |
| 2003/0122930 A1* | 7/2003 | Schofield | B60R 1/00 | 348/148 |
| 2004/0246144 A1* | 12/2004 | Siegel | G08G 1/087 | 340/902 |
| 2006/0184319 A1* | 8/2006 | Seick | G01C 21/28 | 701/533 |
| 2009/0174572 A1* | 7/2009 | Smith | G08G 1/0965 | 340/902 |
| 2010/0019932 A1* | 1/2010 | Goodwin | G08G 1/162 | 340/902 |
| 2012/0313792 A1* | 12/2012 | Behm | G08G 1/0965 | 340/902 |
| 2013/0150004 A1* | 6/2013 | Rosen | H04W 8/22 | 455/414.1 |
| 2014/0081517 A1* | 3/2014 | Barrett | B60K 35/00 | 701/36 |
| 2014/0354449 A1* | 12/2014 | Alam | H04W 4/029 | 340/902 |
| 2014/0376429 A1* | 12/2014 | Khay-Ibbat | H04W 52/0225 | 370/311 |
| 2015/0222977 A1* | 8/2015 | Angel, Jr. | H04R 1/105 | 381/74 |
| 2016/0009222 A1* | 1/2016 | Taylor | G08G 1/0965 | 340/902 |
| 2016/0183667 A1* | 6/2016 | MacColl | A45F 5/00 | 224/222 |
| 2016/0253903 A1* | 9/2016 | Wilk | G08G 1/0965 | 340/902 |
| 2017/0169673 A1* | 6/2017 | Billington | G08B 6/00 | |
| 2017/0215011 A1* | 7/2017 | Goldstein | H04R 25/305 | |

* cited by examiner

EMERGENCY VEHICLE ALERT SYSTEM

CROSS-REFERENCE TO RELATED APPLICATION

The present application is related to and claims priority from prior provisional application Ser. No. 62/479,317, filed Mar. 31, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of emergency vehicle warning systems and more specifically relates to an emergency vehicle alert system.

2. DESCRIPTION OF THE RELATED ART

Drivers often become startled to find an emergency vehicle (EV) such as an ambulance, police car, state trooper, or fire truck—suddenly upon them and then passing at high speed. The sudden fright generally results in automatic reactions from the driver which could result in an accident from swerving out of a reflex action or suddenly changing lanes without checking to see if the adjacent lane is open. Too often, the driver of the vehicle never even hears the approaching EV. This is especially true when listening to electronic devices while wearing ear buds or having the radio volume up too loud. Drivers don't always see or hear EVs approaching from behind or from the side, especially if the EV is traveling at a high rate of speed. Most drivers don't check the rearview mirror ever few seconds and it would probably be unsafe if they did, yet this is what a driver would have to do in order to be aware of every approaching EV. In addition, drivers do not always continuously check the side roads at a distance because of focusing on the direction of travel and having the assumption that all vehicles are traveling within the specified speed limit. The problem is complicated by the high efficiency sound-proofing of modern vehicles. A solution is needed that would have the capability of overriding electronic sound frequencies of vehicles within proximity to EVs to provide an audio warning of the approaching emergency vehicle.

Various attempts have been made to solve the above-mentioned problems such as those found in U.S. Pat. No. 4,764,978 to Eckert H. Argo; U.S. Pat. No. 3,949,300 to William S. Sadler; and U.S. Pat. No. 3,660,811 to John Popik. This art is representative of emergency vehicle warning systems. None of the above inventions and patents, taken either singly or in combination, is seen to describe the invention as claimed.

Ideally, an emergency vehicle warning system should provide an audio warning through radio frequencies of an approaching emergency vehicle, and yet, would operate reliably and be manufactured at a modest expense. Thus, a need exists for a reliable emergency vehicle alert system to avoid the above-mentioned problems.

BRIEF SUMMARY OF THE INVENTION

In view of the foregoing disadvantages inherent in the known emergency vehicle warning systems art, the present invention provides a novel emergency vehicle alert system. The general purpose of the present invention, which will be described subsequently in greater detail, is to provide an audio warning through radio frequencies of an emergency vehicle in proximity.

An emergency vehicle alert system may comprise a transmitter member that is adapted to be located within an emergency vehicle and is adapted to transmit a radio frequency signal within a predetermined radius, a receiver member that is adapted to be located within or upon a transportation vehicle and is adapted to receive the radio frequency signal when within the predetermined radius of the transmitter member, and an alert member that is adapted to be located within or upon the transportation vehicle and is adapted to alert a person operating the transportation vehicle when the receiver member receives a radio frequency signal from the emergency vehicle.

The emergency vehicle alert system further may comprise an audio control member adapted to control the volume of an audio system within the transportation vehicle, such that when the receiver member receives a radio frequency signal from the emergency vehicle the audio control member reduces the volume of the audio system such that the person operating the transportation vehicle can more clearly hear the sirens of the emergency vehicle sending the radio frequency signal to become aware of the emergency vehicle. The audio control member is preferably adapted such that when the transportation vehicle is outside of the predetermined radius of the transmitter member and no longer receiving the radio frequency signal of the emergency vehicle the audio control member returns the volume of the audio system to its prior level. The audio control member may also be adapted to control the audio system within the transportation vehicle to produce an audio sound through the audio system when the receiver member receives a radio frequency signal from the emergency vehicle to increase awareness of the approaching emergency vehicle.

An arm band member may be adapted to be releasably attached to a person's arm to retain the receiver member and the alert member thereon. The alert member is preferably adapted to emit an audio sound and may include a pair of ear phones adapted to emit the audio sound. The alert member may also be adapted to emit vibrations in addition to audio sound.

The receiver member further may be adapted to receive GPS signals for determining the location of the transportation vehicle and the alert member may include a screen member adapted to project a map of the area surrounding the transportation vehicle, project the location of the transportation vehicle, and project the location of the transmitter member within the emergency vehicle. A smart phone may be adapted to house the receiver member and the alert member therein and include a software application adapted to control the receiver member and the alert member.

The Emergency Vehicle Alert would be an electronic, remote-sensing system operating via RF (Radio Frequency); Digital Signal; Telephone Signal (via application); and or any existing communication signal. and the system could be incorporated into the design and manufacture of new motor vehicles.

An arm band member may be adapted to be releasably attached to a person's arm and to retain the smart phone having the alert system. The smart phone may further include a pair of ear phones with the alert member adapted to emit an audio sound through the ear phones via BLUETOOTH technology.

The present invention holds significant improvements and serves as an emergency vehicle alert system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an emergency vehicle alert system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an emergency vehicle warning system and more particularly to an emergency vehicle alert system as used to improve the audio warning through radio frequencies for approaching emergency vehicles.

Generally speaking, an emergency vehicle alert system is an emergency vehicle transmitter system with multiple possible passenger vehicles, motorcycle, and pedestrian receivers that are able to receive the emergency signal when located or passing within a predetermined radius. The system, in addition to the audio warning system, may be adapted to reduce or to silence the volume of radios and personal electronic devices within proximity to the emergency transmission.

Figure 1:
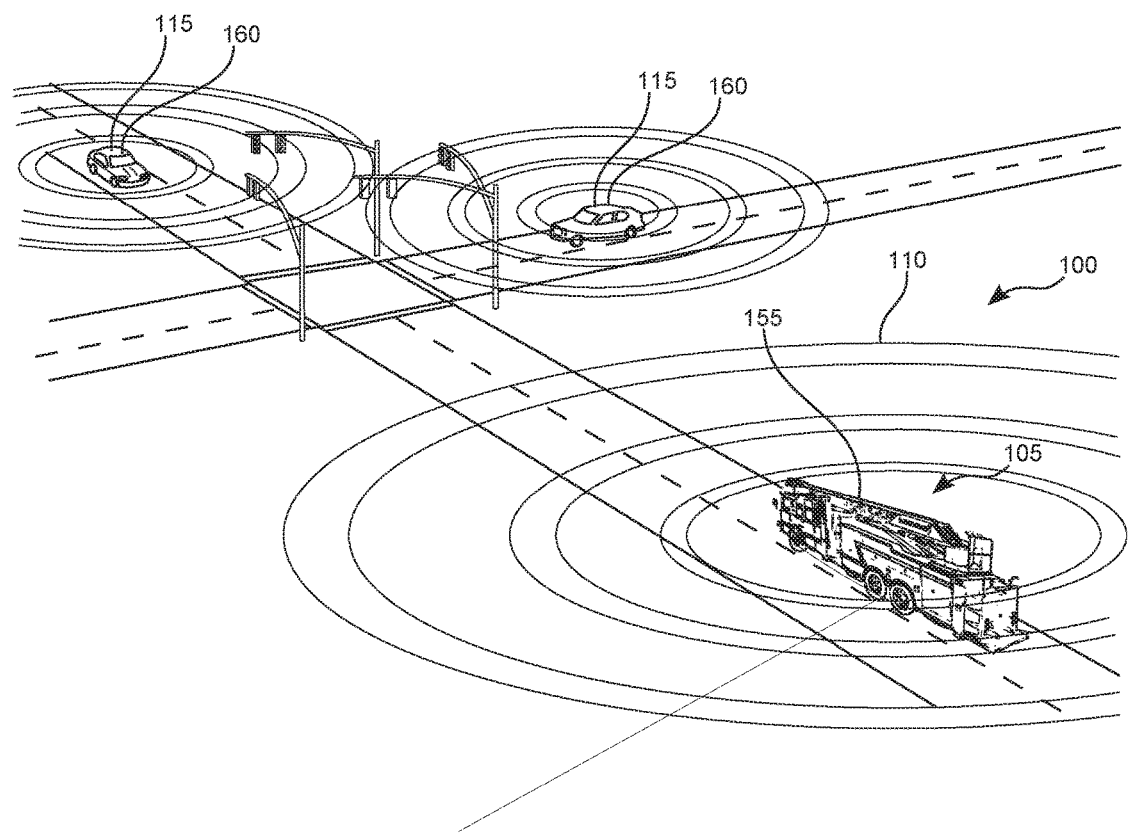
FIG. 1 shows a perspective view illustrating an emergency vehicle alert system according to an embodiment of the present invention.

Referring to the drawings by numerals of reference there is shown in FIG. 1, a perspective view illustrating emergency vehicle alert system 100 according to an embodiment of the present invention.

Emergency vehicle alert system 100 may comprise transmitter member 105 that is adapted to be located within emergency vehicle 155 and is adapted to transmit radio frequency signal 110 within a predetermined radius, a receiver member that is adapted to be located within or upon transportation vehicle 160 and is adapted to receive radio frequency signal 110 when within the predetermined radius of transmitter member 105, and alert member 120 that is adapted to be located within or upon transportation vehicle 160 and is adapted to alert a person operating transportation vehicle 160 when receiver member 115 receives radio frequency signal 110 from emergency vehicle 155.

Emergency vehicle alert system 100 further may comprise audio control member 125 adapted to control the volume of audio system 126 within transportation vehicle 160, such that when receiver member 115 receives radio frequency signal 110 from emergency vehicle 155 audio control member 125 reduces the volume of audio system 126 such that the person operating transportation vehicle 160 can more clearly hear the sirens of emergency vehicle 155 sending radio frequency signal 110 to become aware of emergency vehicle 155.

Figure 2:
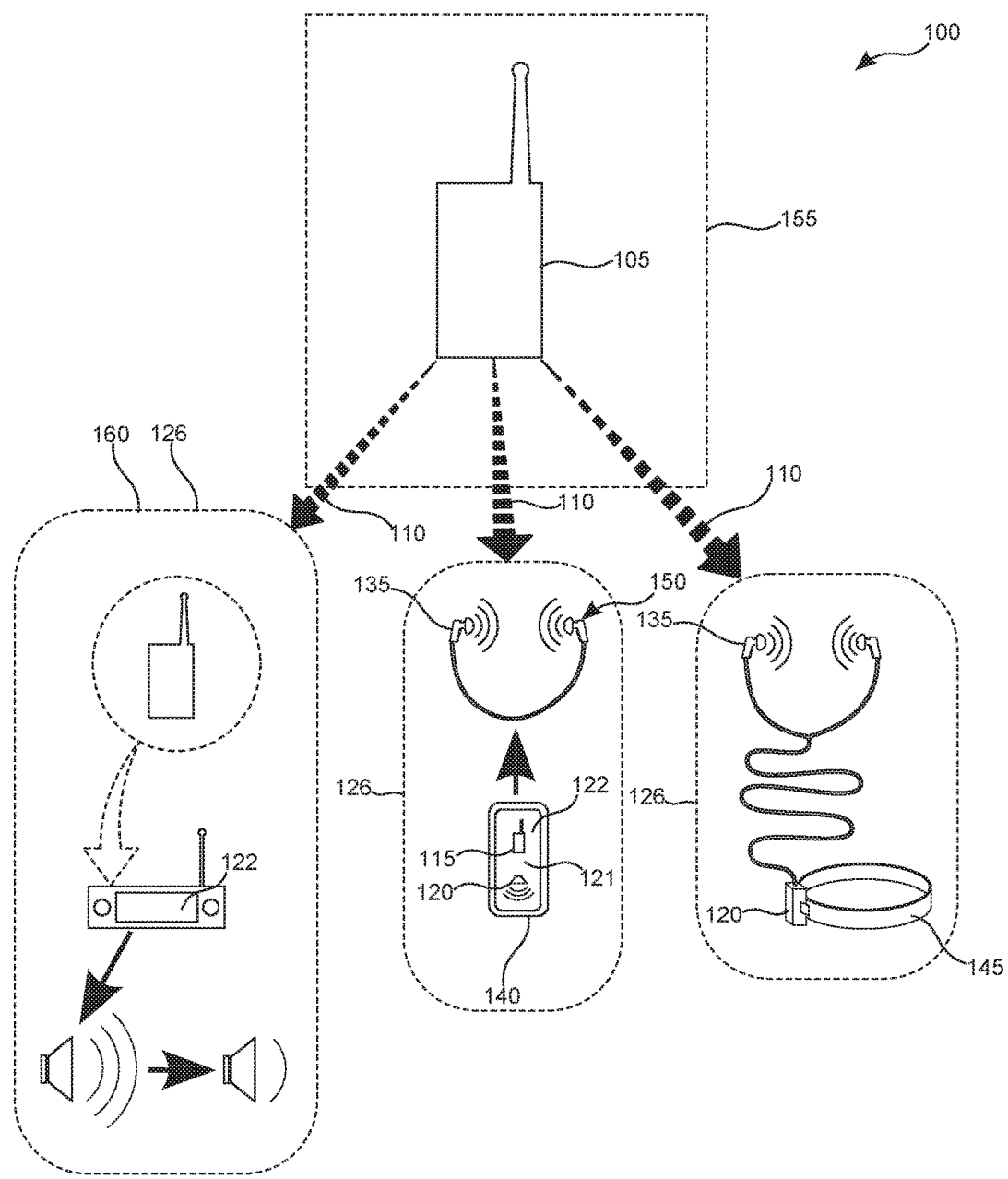
FIG. 2 is a diagram illustrating the emergency vehicle alert system according to an embodiment of the present invention of FIG. 1.

Referring now to FIG. 2, a diagram illustrating emergency vehicle alert system 100 according to an embodiment of the present invention of FIG. 1.

Audio control member 125 is preferably adapted such that when transportation vehicle 160 is outside of the predetermined radius of transmitter member 105 and no longer receiving radio frequency signal 110 of emergency vehicle 155 audio control member 125 returns the volume of audio system 126 to its prior level. Audio control member 125 may also be adapted to control audio system 126 within transportation vehicle 160 to produce an audio sound through audio system 126 when receiver member 115 receives radio frequency signal 110 from emergency vehicle 155 to increase awareness of the approaching emergency vehicle 155.

Arm band member 145 may be adapted to be releasably attached to a person's arm to retain receiver member 115 and alert member 120 thereon. Alert member 120 is preferably adapted to emit an audio sound and may include a pair of ear phones 135 adapted to emit the audio sound. Alert member 120 may also be adapted to emit vibrations in addition to audio sound.

Figure 3:
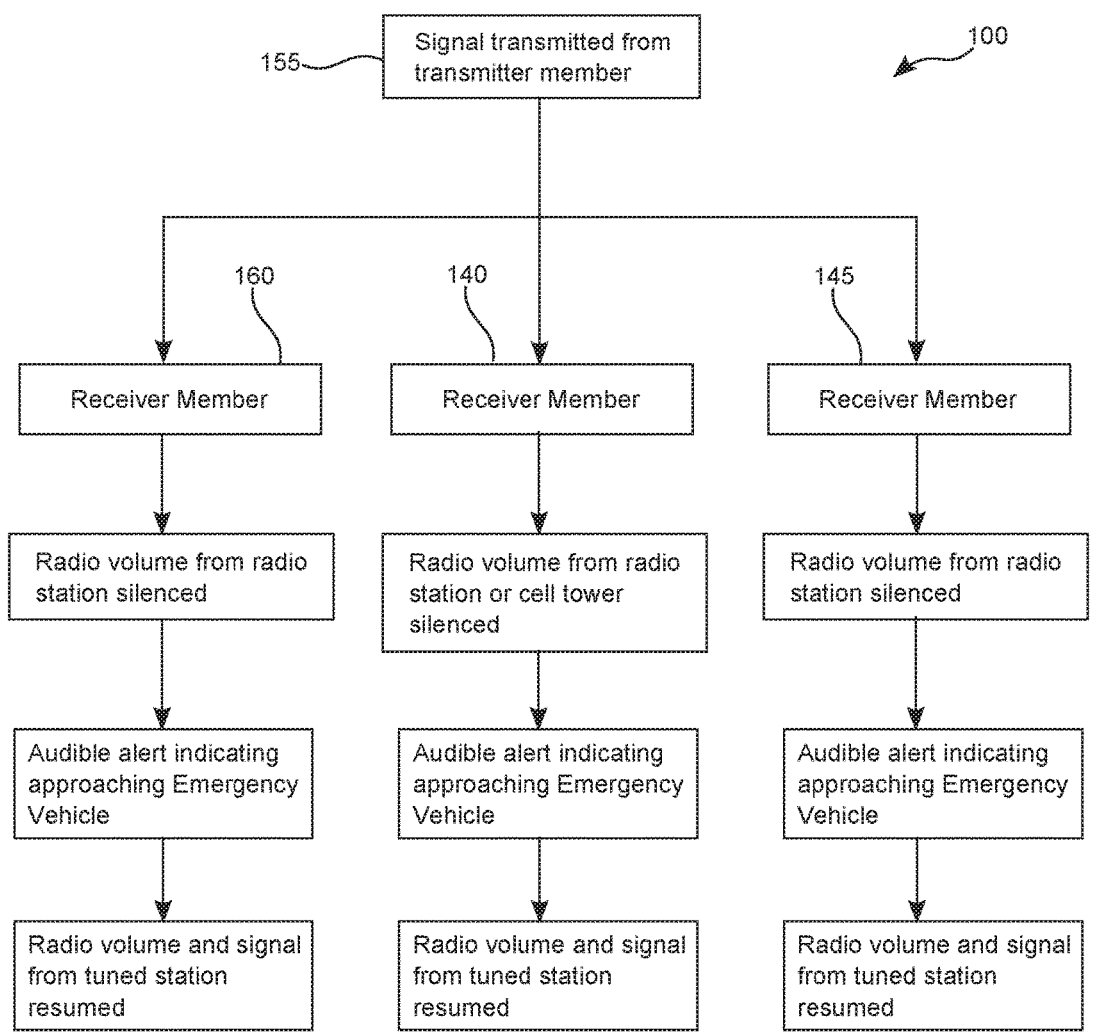
FIG. 3 is a flow chart illustrating an emergency vehicle alert system according to an embodiment of the present invention of FIG. 1.

Referring now to FIG. 3, is a flow chart illustrating emergency vehicle alert system 100 according to an embodiment of the present invention of FIG. 1.

Receiver member 115 further may be adapted to receive GPS signals for determining the location of transportation vehicle 160 and alert member 120 may include screen member 121 adapted to project map 122 of the area surrounding transportation vehicle 160, project the location of transportation vehicle 160, and project the location of transmitter member 105 within emergency vehicle 155. Smart phone 140 may be adapted to house receiver member 115 and alert member 120 therein and include a software application adapted to control receiver member 115 and alert member 120.

Emergency vehicle alert system 100 would be an electronic, remote-sensing system operating via radio frequency signal 110; Digital Signal; Telephone Signal (via application); and or any existing communication signal. The system could be incorporated into the design and manufacture of new emergency vehicles 155 and transportation vehicles 160.

Arm band member 145 may be adapted to be releasably attached to a person's arm and to retain smart phone 140 having alert member 120. Smart phone 140 may further include a pair of ear phones 135 with alert member 120 adapted to emit an audio sound through ear phones 135 via BLUETOOTH technology 150.

Emergency vehicle alert system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., adjustments in size, shape, exact materials of construction, including or excluding certain maintenance steps, addition or exclusion of necessary components to enable the novel aspects of the invention etc., are understood and may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An emergency vehicle alert system comprising: a transmitter;
    wherein said transmitter is located within an emergency vehicle; and
    wherein said transmitter transmits a radio frequency signal within a predetermined radius;
    a first receiver;
    wherein the first receiver is located within or upon a transportation vehicle;
    a second receiver located within a smartphone;
    a third receiver located within or upon an arm band;
    wherein the first receiver, the second receiver and third receiver simultaneously receive the transmitted radio frequency signal within the predetermined radius;
    wherein the first receiver, the second receiver and the third receiver receive said radio frequency signal when within said predetermined radius of said transmitter; and
    wherein the first receiver, the second receiver and the third receiver receive GPS signals for determining the location of said transportation vehicle;
    the first receiver, the second receiver and the third receiver connected to first alerting component, a second alerting component and third alerting component respectively; the first and the second alerting components further comprise:
    a screen adapted to project a map of an area surrounding said transportation vehicle and project the location of said transmitter;
    the alert system is further adopted to silence or reduce volume of a radio, being operated in the transportation vehicle, and the smartphone within proximity of the emergency vehicle;
    wherein the first alerting component alerts a person operating said transportation vehicle when the first receiver receives the radio frequency signal from said emergency vehicle; and
    wherein the first alerting component, the second alerting component and the third alerting component further emit vibrations and sound;
    the smart phone further including:
    a pair of ear phones;
    wherein said pair of ear phones are connected to second alerting component; and
    wherein second alerting component emits an audio sound through said pair of ear phones;
    and
    wherein said smart phone includes a software application adapted to control the second receiver and second alerting component;
    wherein said arm band is adapted to be releasably attached to a person's arm and retain the third receiver, the third alerting component, wherein the arm band is further adopted to alert a person wearing the arm band, and said smart phone.

* * * * *